United States Patent [19]
Desu et al.

[11] Patent Number: 5,593,727
[45] Date of Patent: Jan. 14, 1997

[54] PRODUCTION OF FILMS OF $SiO_2$ BY CHEMICAL VAPOR DEPOSITION

[75] Inventors: Seshu B. Desu; Chien-Hsiung Peng, both of Blacksburg, Va.; Tian Shi, Beijing, China; Pradyot A. Agaskar, Hopewell Township, N.J.

[73] Assignee: Virginia Tech Intellectual Properties, Inc., Blacksburg, Va.

[21] Appl. No.: 148,391

[22] Filed: Nov. 8, 1993

Related U.S. Application Data

[63] Continuation of Ser. No. 871,389, Apr. 21, 1992, abandoned, which is a continuation-in-part of Ser. No. 668,032, Mar. 12, 1991, Pat. No. 5,106,604.

[51] Int. Cl.⁶ .................................................... C23C 16/00
[52] U.S. Cl. .................... 427/248.1; 427/255.1; 427/255.2; 427/255.3; 528/31
[58] Field of Search .................................. 427/583, 582, 427/255.3, 255.2, 255.1, 248.1, 578, 579; 528/31

[56] References Cited

U.S. PATENT DOCUMENTS 3,615,272 10/1971 Collins ........................................ 23/366
5,165,955 11/1992 Gentle ........................................ 427/575
5,310,583 5/1994 Eckstein et al. ........................... 427/575

*Primary Examiner*—Roy V. King
*Attorney, Agent, or Firm*—Sheldon H. Parker

[57] ABSTRACT

The chemical vapor deposition of hydridospherosiloxane to generate films of $SiO_2$ at low temperatures on substrates that cannot withstand high temperatures. The chemical vapor deposition process synthesized compounds with the general formula, $$(HSiO_{3/2})_n,$$

with n being an even number ranging from 8 to a very large number. More particularly, it relates to the vapor deposition of oligomeric hydrogensilsesquioxanes, henceforth referred to as hydridospherosiloxanes. The hydridospherosiloxanes are used directly in a chemical vapor deposition reactor to generate films of $SiO_2$ at low temperatures on substrates that cannot withstand high temperatures. Hydridospherosiloxanes and soluble hydrogensilsesquioxane resin are produced having the formula $$(HSiO_{3/2})_n,$$

where n is an even integer greater than 8.

16 Claims, 4 Drawing Sheets

PRODUCTION OF FILMS OF $SiO_2$ BY CHEMICAL VAPOR DEPOSITION

RELATE BACK

This application is a continuation of U.S. Ser. No. 07/871,389, filed Apr. 21, 1992, now abandoned, which is a continuation-in-part of U.S. Ser. No. 07/668,032, filed Mar. 12, 1991, and issued Apr. 21, 1992 as U.S. Pat. No. 5,106,604, the disclosures of which are incorporated herein as if cited in full.

BACKGROUND OF THE INVENTION

1. Field of the Invention

The invention disclosed herein relates to a chemical vapor deposition process synthesized compounds with the general formula, $$(HSiO_{3/2})_n,$$

with n being an even number ranging from 8 to a very large number. More particularly, it relates to the vapor deposition of oligomeric hydrogensilsesquioxanes, henceforth referred to as hydridospherosiloxanes. The hydridospherosiloxanes are used directly in a chemical vapor deposition reactor to generate films of $SiO_2$ at low temperatures on substrates that cannot withstand high temperatures.

2. Description of the Prior Art

The use of hydridospherosiloxanes directly in a chemical vapor deposition reactor to generate films of $SiO_2$ at low temperatures on substrates that cannot withstand high temperatures, is dependent for its commercial feasibility on the commercial availability of hydridospherosiloxanes and on the availability of an economical method of synthesizing these compounds.

The state of the art up to ca. 1980 with regard to the synthesis, properties and uses of the compounds of composition $(HSiO_{3/2})_n$ with $n \geq 8$, generally known in the art by the common name hydrogensilsesquioxanes and abbreviated to $HT_n$, has been summarized in the Gmelin Handbook of Inorganic Chemistry-Si, Supplement Volume B1, pg. 249–251; Publisher Springer-Verlag, Berlin-Heidelberg-New York, 1982. A survey of publications dealing with hydridospherosiloxanes covering the period form 1980 to 1990 shows that the state of the art with regard to the synthesis of the hydridospherosiloxanes has not progressed beyond that described in the publication by C. L. Frye and W. T. Collins in J. Am. Chem. Soc. 1970, 92, 5586–5588 and in U.S. Pat. No. 3,615,272; 1972 assigned to Dow Corning Corporation, Midland, Mich., except in the aspects related to post-synthesis separation methodology. However, these publications, which are listed below, reveal a number of potential applications of the hydridospherosiloxanes which clearly establish the utility of the invention disclosed herein. The publication by V. W. Day et al. in J. Am. Chem. Soc. 1985, 107, 8262–8264 reveals that the compound $(HSiO_{3/2})_8$ 1 can be used as a precursor for the synthesis of the compounds $(ClSiO_{3/2})_n$ 2 and $(H_3COSiO_{3/2})_n$ 3. Compound 3 can be used as a molecular building block for the synthesis of ceramic materials. Compound 2 has been used as a surface modification agent by R. Beer et al. as described in J. Electron Spectroscopy and Related Phenomena 1987, 44, 121–130. Compound 1 and $(HSiO_{3/2})_{10}$ 4 have been used as precursors of functionalized spherosilicates, which have the general formula $$[SiO_{2.5}]_n(Si(CH_3)_2Y)_n$$

where n=8 or 10 and Y may be —$CH_2Cl$ or —$CH=CH_2$, by P. A. Agaskar as described in Synth. React. Inorg. Met.-Org. Chem. 1990, 20, 483–493. The use of these functionalized spherosilicates as precursors of the inorganic/organic hybrid materials called organolithic macromolecular materials (OMM's) is described by P. A. Agaskar in J. Am. Chem. Soc. 1989, 111, 6858. The OMM's can be pyrolyzed under $N_2$ and converted to microporous ceramic materials by differential leaching with HF.

$SiO_2$ film deposition has been accomplished primarily through chemical vapor deposition using TEOS at temperatures of about 650° through the oxidation of silane which yields poor quality films.

OBJECTS OF THE INVENTION

It is an object of the invention to provide for the low temperature film formation of $SiO_2$ on substrates.

It is another object of the present invention to produce high quality $SiO_2$ thin films.

It is another object of the present invention to produce high quality $SiO_2$ thin films with a process that does do require toxic chemicals.

It is another object of the present invention to produce high quality $SiO_2$ thin films, with a high yield process.

It is another object of the present invention to produce high quality $SiO_2$ thin films, free of carbon contamination.

Upon consideration of the following specifications and appended claims, it will be apparent to one skilled in the art that these objects along with others not explicitly listed above are provided by the invention disclosed herein.

SUMMARY OF THE INVENTION

It has now been found that chemical vapor deposition of films of $SiO_2$ at low temperatures on substrates that cannot withstand high temperatures, can be achieved through the use of hydridospherosiloxanes directly in the chemical vapor deposition process. The use of hydridospherosiloxane to deposit $SiO_2$ films, provides the unique advantages of a deposition temperature of under about 450°, a non-toxic process, high yield and ease of deposition. The process can be applied to substrates such as GaAs and aluminum.

The hydridospherosiloxanes can be produced economically by the novel process, of copending U.S. patent application No. 07/668,032, now U.S. Pat. No. 5,106,604. In accordance with the present invention, hydridospherosiloxane is produced having the formula $$(HSiO_{3/2})_n,$$

where n is an even integer between 8 and 20.

A biphasic reaction medium is prepared, having a first solvent phase and a second solvent phase. The first solvent phase can contain an aliphatic or aromatic hydrocarbon solvent. The first solvent phase can be hexane or pentane. The second solvent phase is a concentrated solution of a metal salt in a polar organic solvent such as an alcohol and water. The alcohol can be methanol or ethanol. The metal salt can be a salt of Fe(III). A silicon compound represented by the formula:

$$HSiX_3,$$

where X is is group which is hydrolyzable in the solvent of said first solvent phase, is added to the biphasic reaction medium. X can be Cl or $OCH_3$. The first solvent phase is separated from the said second solvent phase and then the separated first solvent phase is treated with a metal salt containing carbonate ions, for a time period which is just sufficient to remove by-products. The metal salt is preferably sodium or potassium carbonate or alternatively calcium carbonate. Slow evaporation of the first solvent phase solvent is employed to isolate a mixture of crystals of $(HSiO_{3/2})_8$, and $(HSiO_{3/2})_{10}$. The crystal mixture is washed with a hydrocarbon solvent and crystals of $(HSiO_{3/2})_8$ are isolated.

Hydrochloric acid which is generated is reacted with the residual metal carbonate to form a metal chloride salt. The method is advantageously carried out as a continuous process.

DESCRIPTION OF THE PREFERRED EMBODIMENTS OF THE INVENTION

Figure 1:
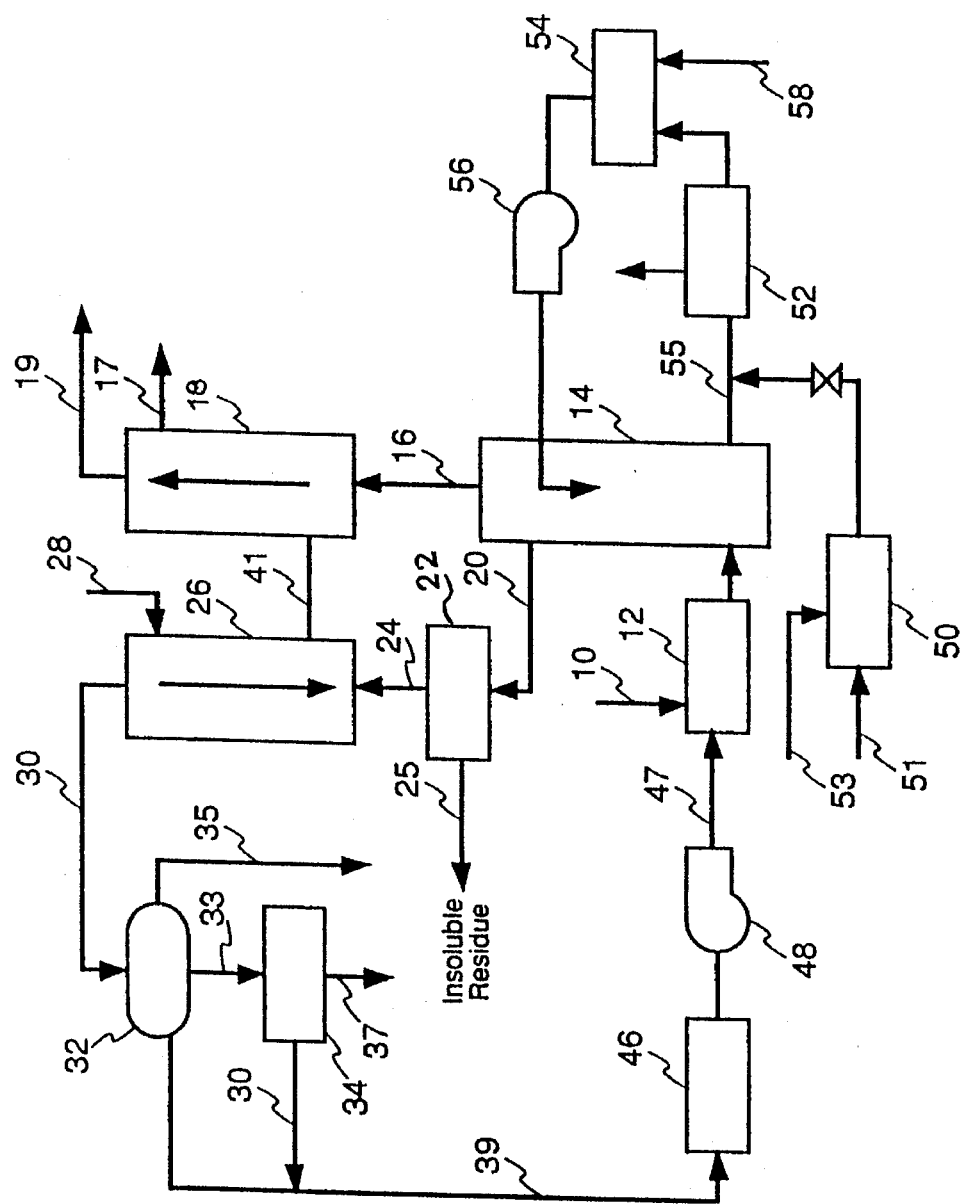
FIG. 1 is a schematic illustration of the chemical vapor deposition method of the instant invention.

Films of $SiO_2$ are formed, at low temperatures on substrates that cannot withstand high temperatures, by a chemical vapor deposition process using hydridospherosiloxane. The use of chemical vapor deposition provides among its advantages, the ability to provide excellent coverage of substrates with complex shapes, uniform deposition, high quality films and low cost. The hydridospherosiloxanes can also be directly used in a chemical vapor deposition reactor to generate films of $SiO_2$ at low temperatures on substrates that cannot withstand high temperatures.

The yield achieved with the instant invention is high since the hydridospherosiloxane is 98 weight percent Si and O. The deposition is relatively easy to achieve since the Si—O—Si structure exits in the hydridospherosiloxane.

The substrates can be temperature sensitive materials, such as GaAs and aluminum, since the operation can be carried out at 450° C., or less.

The process can be carried out at a below 450° C. and preferably below 400° C. The procedure for the production of the hydridospherosiloxane comprises of the following steps.

a. Preparation of a biphasic reaction medium consisting of a hydrocarbon phase and an immiscible polar phase containing high concentrations of a metal salt, specifically Iron(III) chloride, along with some water, where the molar ratio of water to the metal ion, specifically Fe(III), is less than that required to saturate the available coordination sites on the metal ion, specifically $[H_2O]/[Fe(III)] \leq 6$, and a solubilizing amount of alcohol, specifically methanol.

b. Addition of a solution of a silicon compound of the type $RSiX_3$ where X is Cl, $OCH_3$ or any easily hydrolyzable group and R is H or any organic group, specifically $HSiCl_3$, dropwise over a period of time with vigorous mixing, to the reaction medium described in part a above.

c. Separation of the two phases after the addition described above in part b and treatment of the hydrocarbon phase with an acid scavenger, specifically a metal salt containing carbonate ion e.g. $K_2CO_3$, and a additionally a desiccant, specifically $CaCl_2$, to aid complete condensation of silanol groups and to protect the desired compounds from the degrading action of water.

d. Redirection of the polar non-hydrocarbon phase leftover after the operations of part c described above towards the operation of part a after making up the losses of water due to incorporation into the desire product.

e. Isolation from the hydrocarbon phase after treatment as described in part c of a mixture of crystals of $HT_8$ and $HT_{10}$ by crystallization induced by slow evaporation of hydrocarbon solvent and isolation of pure $HT_8$ from this mixture by washing with limited amounts of hydrocarbon solvent. Additionally, isolation of the dissolved solid in the mother liquor, which is the condensed soluble hydrogensilsesquioxane resin, by complete removal of hydrocarbon solvent.

f. Destruction of the corrosive hydrochloric acid gas generated as a result of the operation of part b by reaction with the excess of the carbonate ions used in the operations of part c.

g. Redirection of the hydrocarbon solvent vapors generated by the operation of part e after condensation towards reconstitution of the reaction medium prepared as described in part a.

The hydrocarbon solvent used may be any suitable aliphatic or aromatic compound or a mixture of any or all such suitable compounds. the operational definition of 'suitable' in this context involves the favorable combination of three factors.

a. Solubility of the monomeric silicon compounds.

b. Solubility of the product molecular compounds and resin.

c. Stability of the product molecular compounds and resin.

Exemplary of such suitable solvents are pentane, hexane, heptane, cyclohexane, benzene, toluene, xylene. Halogenated solvents such as carbon tetrachloride may also be considered suitable in this context. Though mixtures of solvents can be used, the use of pure solvents is to be preferred in order to facilitate recycling as described in part g of the procedure described above.

The metal salt used in part a of the procedure described above should have a strong affinity for water and should dissolve to a large extent in a polar solvent to form a phase which is immiscible with the hydrocarbon or other suitable phase described in the previous paragraph. The polar solvent used in the examples described below is methanol, however, a large number of alcohols and ethers such as ethanol, isopropanol, glycerol, diethyl ether, tetrahydrofuran, diglyme are obvious alternatives that could be used instead of methanol. The metal salt used in the examples described below is iron(III) chloride, however, iron(III) sulfate, iron(II) chloride, calcium chloride or any of a number of metal salts that function in the manner described at the beginning of this paragraph, are obvious alternatives that could be used instead of iron(III) chloride.

The silicone compound which is used in the examples given below is trichlorosilane, $HSiCl_3$. However, in the presence of alcohols, this may be converted to the alkoxy derivatives, consequently such derivatives may be used directly instead of $HSiCl_3$. The concentration of such monomeric silicon compounds in the solution added to the reaction medium described in part a of the procedure given above, may be varied over a wide range and so can the time over which such addition is carried out. The operative consideration here is the 'high-dilution' principle which states that the formation of highly cyclised materials, such as the hydridospherosiloxanes, is favored by high-dilution of reactants. Lowering the concentration and increasing the time of addition thus favor the formation of hydridospherosiloxanes at the cost of reducing the output per unit time. however, carrying out the procedure in a continuous manner as described below can counteract this unfavorable cost factor, thus enhancing the overall yield of the hydridospherosiloxanes.

Post-reaction treatment with metal salts is a means of rapidly removing several objectionable components from the solvent phase containing the dissolved hydridospherosiloxanes and hydrogensilsesquioxane resin in order to prevent structural degradation of these desirable materials. The objectionable compounds are a) hydrochloric acid b) surfactant molecules, c) suspended metal salt solution d) water. The removal of water also promotes complete condensation of silanol moieties. The metal salts used in the examples give below are potassium carbonate and calcium chloride, however, other suitable salts are sodium carbonate, sodium bicarbonate, calcium carbonate, barium oxide or any other metal salt or combination of metal salts that can achieve the removal of the four undesirable constituents listed above.

The reaction product is a mixture of the hydridospherosiloxanes $HT_8$ and $HT_{10}$, which are volatile molecular compounds with cubic and pentagonal prismatic structures respectively, and condensed soluble hydrogensilsesquioxane resin. The hydridospherosiloxanes $HT_8$ and $HT_{10}$ can be isolated by crystallization or alternatively since they are volatile by sublimation.

Execution of the procedures described above in the several forms described in the examples provided below results in high yields (ca. 25%–36%) of crystals of $HT_8$ and $HT_{10}$ and subsequently of pure $HT_8$ (ca. 13%–23%). In addition high yields (46%–56%) of condensed soluble hydrogensilsesquioxane resin are also obtained.

The procedure may be executed in a batch manner as described in the examples provided below or preferably in a continuous manner. Several features mentioned in the specifications listed above make the procedure especially well-suited for operation in a continuous manner. These features are the ability to reuse the water containing metal salt solution and the possibility of recycling the hydrocarbon solvent which plays only a passive role in the operation of this procedure. Another feature of this procedure that is especially suited for scale-up is the fact that the corrosive by-product which is HCl, when the readily available trichlorosilane is used, can be converted to environmentally benign metal metal chloride salts, e.g. KCl by reaction with the carbonate ions used in the operations of part c.

EXAMPLE 1

$FeCl_3$ (anhydrous, 50 g) was taken in a 1 L round bottomed flask and concentrated HCl (20 mL) was added followed by $CH_3OH$ (40 mL). Hexane (Mixture of isomers, 350 mL) and toluene (50 mL) were then added and the biphasic mixture was stirred by a heavy magnetic stirrer. A solution of $HSiCl_3$ (20 mL, 0.2 mol) in hexane (150 mL) was added dropwise over a period of 9 hours. After an additional 30 minutes of stirring, the upper hexane layer which had a slight yellow color was transferred to another round-bottomed flask along with some suspended yellow solid. $K_2CO_3$ (14 g) and $CaCl_2$ (10 g) were added to the flask and the contents stirred overnight. The mixture was filtered and the volume of the colorless filtrate was reduced by evaporation until it was ca. 20 mL. The crystals that were deposited were collected and washed with hexane (ca. 20 mL). The mother liquor and the washings were pooled and the volume reduced by evaporation until it was <10 mL. A second crop of crystals was collected and washed with hexane (ca. 10 mL). The total yield of crystals was 2.88 g. The solid non-crystalline soluble residue weighted 4.9 g.

The crystals were analyzed by $^1H$ NMR and shown to be a mixture of $HT_8$ and $HT_{10}$ (ca. 3.5:1). Yield 27.2% based n $HSiCl_3$.

Pure $HT_8$ was isolated (1.85 g, 17.5% yield based on $HSiCl_3$) by washing off the $HT_{10}$ along with some $HT_8$ using hexane (ca. 45 mL).

EXAMPLE 2

The $FeCl_3$ containing layer leftover from Example 1 was taken in a 1 L round bottomed, concentrated HCl (5 mL) was added followed by hexane (350 mL) and toluene (50 mL). The biphasic mixture was stirred by a heavy magnetic stirrer and a solution of $HSiCl_3$ (20 mL, 0.2 mol) in hexane (150 mL) was added dropwise over a period of 4.5 hours. After an additional 1 hour of stirring the upper hexane layer was separated and treated as described in Example 1.

Total yield of crystals was 2.67 g. These were a mixture of $HT_8$ and $HT_{10}$ (ca. 4:1) as shown by $^1H$ NMR). Yield 25.2% based on $HSiCL_3$.

$HT_8$ was isolated (1.78 g, 16.8% based on $HSiCl_3$) as described in Example 1.

EXAMPLE 3

$FeCl_3$ (anhydrous, 100 g) was taken in a 3-L Norton flask (i.e. an indented round-bottomed flask), concentrated HCl (40 mL) was added followed by $CH_3OH$ (80 mL), hexane (500 mL) and toluene (50 mL). The biphasic mixture was stirred vigorously with a mechanical stirrer and a solution of $HSiCL_3$ (4o mL, 0.4 mol) in hexane (200 mL) was added dropwise over a period of 90 minutes. When the addition was complete, the stirring was stopped and the reaction mixture was allowed to separate into two layers. The upper hexane layer was transferred to a 2 L round-bottomed flask and $K_2CO_3$ (14 g) and $CaCl_2$ (11 g) were added. The mixture was stirred for ca. 270 minutes and filtered. The clear filtrate was reduced in volume by evaporation. The mother liquor (ca. 20 mL) was removed from the crystals (total weight= 4.49) which were washed with 10 mL portions of hexane until the weight loss after a wash was only ca. 60 mg.

The residue which weighed 2.75 g was pure $HT_8$. Yield 13% based on $HSiCl_3$.

EXAMPLE 4

Concentrated HCl (10 mL) was added to the spent $FeCl_3$ layer of Example 3. Sodium dodecylsulfate (2.0 g) was then added followed by hexane (800 mL). A solution of $HSiCl_3$ (40 mL, 0.4 mol) in the hexane (200 mL) was added dropwise over a period of 2 hours while the biphasic mixture was being stirred vigorously. AFter an additional 30 minutes of stirring, the two layers were separated and the hexane layer transferred to a 2 L flask containing $K_2CO_3$ (21 g) and $CaCl_2$ (14 g). The mixture was stirred overnight and then filtered. Pure $HT_8$ was isolated as described in Example 3.

Weight of $HT_8$ isolated was ca. 3.5 g. Yield ca. 16.% based on $HSiCl_3$.

EXAMPLE 5

$FeCl_3$ (anhydrous, 100 g) was taken in a 3 L Norton flask and concentrated HCl (40 mL) was added followed by $CH_3OH$ (80 mL), sodium dodecylsulfate (3.0 g) and hexane (800 mL). A solution of $HSiCl_3$ (40 mL, 0.4 mol) in hexane (400 mL) was then added dropwise over a period of 6 hours while the biphasic mixture was being stirred vigorously. After an additional 30 minutes of stirring the two layers were allowed to separate and the upper hexane layer was transferred to a 2 L round-bottomed flask. $K_2CO_3$ (28 g) and $CaCl_2$ (11 g) were added, the mixture stirred overnight and then filtered. When the solvent was allowed to evaporate from the clear filtrate, a white crystalline precipitate was obtained. The mother liquor (ca. 50 mL) was removed, the crystals washed with hexane (ca. 50 mL) and the washings combined with the mother liquor. The first crop of crystals weight 4.6 g. The volume of the pool mother liquor and washings was reduced to ca. 10 mL by slow evaporation and a second crop of crystals was isolated and washed with hexane (ca. 10 mL). Combined weight of crystals was 5.7 g. The soluble residue weighted 12.0 g after all solvent was removed.

The crystals were washed with hexane (10 mL portions) until the weight loss associated with the washing was ca. 60 mg. The residue which weighed 3.57 g was pure $HT_8$. Yield based on $HSiCl_3$ was 17.7%. The rest of the crystalline product was a mixture of $HT_8$ and $HT_{10}$ (ca. 1:2). Total yield 26.9%.

EXAMPLE 6 n-Pentane (700 mL) was added to the spent $FeCl_3$ layer of Example 5. A solution of $HSiCl_3$ (17 mL, ~0.17 mol) in n-pentane (300 mL) was added over a period of 4 hours. After the stirring was stopped the upper pentane layer was transferred to a 2 L round-bottomed flask and treated with $Na_2CO_3$ (50 g). After stirring overnight the mixture was filtered and dealt with as detailed in Example 5. Combined weight of $HT_8$ and $HT_{10}$ crystals was 3.03 g. Yield based on $HSiCL_3$ 45.6%. Pure $HT_8$ (1.95 g) was isolated in 22.9% yield based on $HSiCl_3$.

As illustrated in FIG. 1, the method of the instant invention, can be carried out in a continuous mode.

Continuous Process

A feed stream 10, of $HSiCl_3$ is supplied to a mixer 12 and then to the lower end of counter current mixer/agitator 14. Gaseous HCl is removed from the agitator 14 via line 16 and delivered to a column 18. Line 17 delivers $CO_2$ from the top of the column 18 while line 19 carries $CaCl_2$. Bottoms from the downflow column 26 is delivered via line 41 to the upflow column 18. A second effluent stream 20 is passed through a filter 22, and delivered, via line 24, to the column 26. Insoluble residue is removed from the system by means of the filter 22, and disposed of via line 25. The metal salt calcium carbonate is delivered to the column 26 via line 28. Effluent is removed from the column 26 via line 30 and delivered to an evaporative concentrator crystallizer 32. A first product stream 35 contains a mixture of $(HSiO_{3/2})_8$ and $(HSiO_{3/2})_{10}$. A second product stream 33 feeds to an evaporator 34 and then to an outlet stream 37, which contains $(HSiO_{3/2})_n$, where n is at least 12 and up to about 20. The line 43 delivers $C_5H_{12}$ from the evaporator 34 to the line 39 which feeds to the condenser 46.

$C_5H_{12}$ can be added via line 47 to the stream being fed from the pump 48 to the mixer 12.

$FeCl_3$ and $CH_3OH$ are feed to mixer 50, via feed line 51 and 53 respectively. The mixed feed of $FeCl_3$ in the solvent $CH_3OH$ is added, as required, to the $FeCl_3$ stream 55. The filter 52 removes insoluble residue from the $FeCl_3$ feed stream 55. Water line 58, delivers water to the mixer 54, where it is mixed with the $FeCl_3$ and then pumped by pump 56 to the top of the counter current mixer/agitator 14.

EXAMPLE 7

Figure 2:
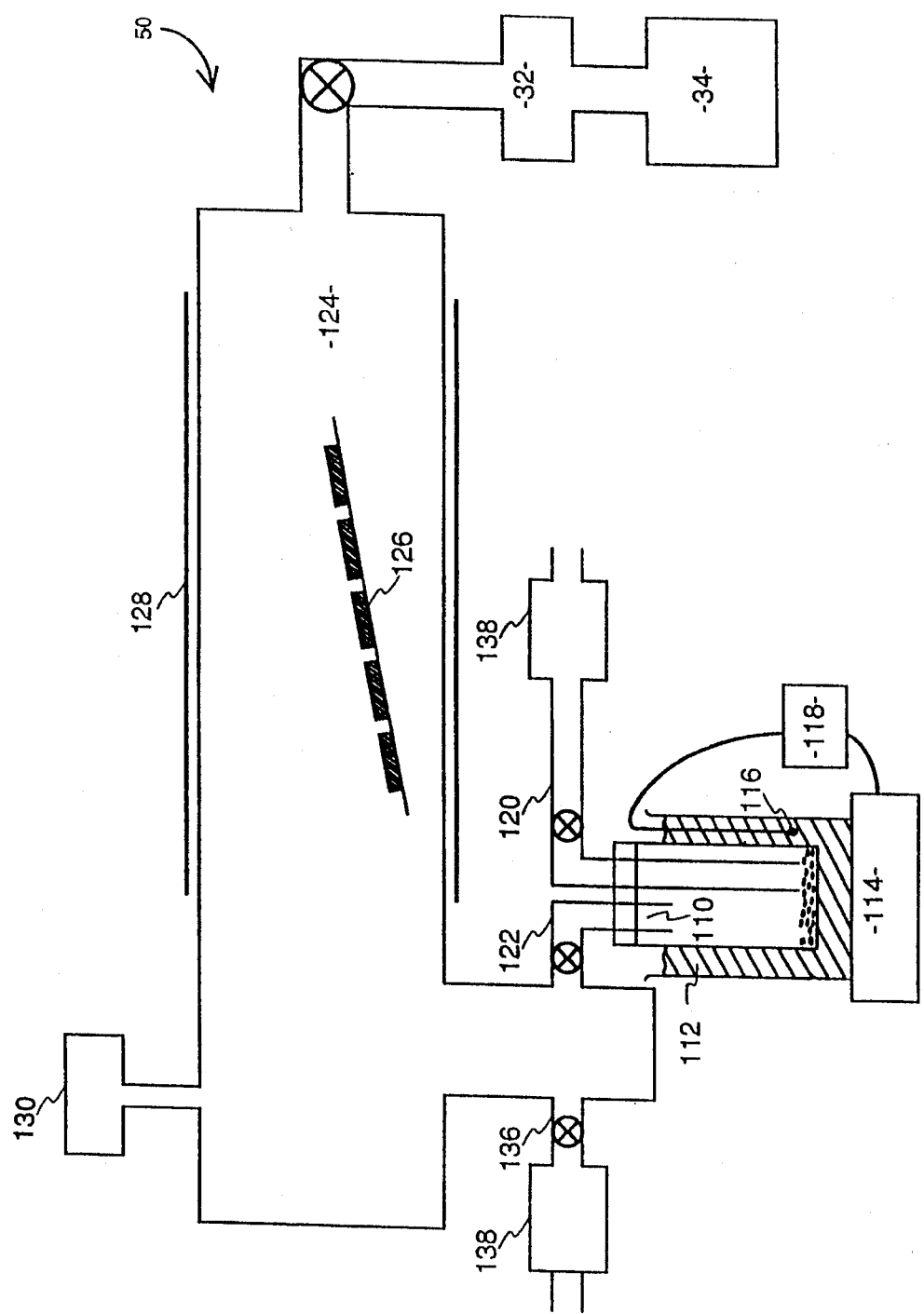
FIG. 2 is a schematic of the CVD apparatus of the instant invention.

As shown in the FIG. 2, the hydridospherosiloxane is heated in a chamber 110. The temperature of the chamber 110 is maintained at a constant level through the use of a silicone oil bath 112, which is in thermal contact with a hot plate 114. A thermocouple, or other temperature sensor, relays a signal to a temperature controller 118, which regulates the temperature of the hot plate 114. Oxygen is fed to the chamber 110 via a conduit 120, from a conventional source of oxygen, not shown. The vapor generated in the chamber 110 passes through the conduit 122, to a deposition chamber 124. A plurality of substrates 26, are supported in the chamber 124. The temperature in the substrate chamber 124 is maintained at the required elevated level by means of the heat coils 128, which can be electric coils or heated fluid containing coils. A pressure transducer 130 is employed in order to regulate the pressure in the substrate chamber 124. The deposition rate is varied by controlling the $O_2$ flow rate, the precursor temperature the deposition temperature and the total substrate chamber pressure.

EXAMPLE 8

In chemical vapor deposition process, the precursor vapors are generated and transported into a reactor, containing the specimens to be coated, with the help of a vacuum pump and/or a carrier gas. These vapors are decomposed in the reaction chamber to result in the formation of $SiO_2$ films.

FIG. 2 illustrates the reactor 150 as used in the instant disclosure. Pure hydridospherosiloxane (HT8) is heated in a chamber 110 at a constant temperature which is maintained through the use of a silicone oil bath 112. The silicone oil bath 112 is in thermal contact with a hot plate 114 or other similar heating device, which controls the temperature through the temperature controller 118. A thermocouple 116, or other temperature sensor, is placed in the silicone oil bath 112 and relays a temperature reading to the temperature controller 118, which regulates the temperature of the hot plate 114. Oxygen is fed to the chamber 110 via a conduit 120 from a conventional source of oxygen, not shown. The amount of oxygen fed into the chamber 110 is controlled by a mass flow controller 138. The vapor generated in the chamber 110 passes through the conduit 122 into a deposition chamber 124. A plurality of substrates 126 are suspended within the deposition chamber 124 to receive the vapor from the chamber 110. The vapor accumulates on the substrates to form the film. The temperature in the substrate chamber 124 is maintained at the required elevated level by means of a heating device 128, The heating device 128 can be electric coils or heated fluid containing coils, or any other heating mechanism which meets the criteria. A pressure transducer 130 is employed in order to regulate and maintain the pressure in the substrate chamber 124. The cold trap 132, which can be water-cooled or liquid-nitrogen cooled, is installed between chamber 124 and pump 134 in order to condense the unreacted particles.

Figure 4:
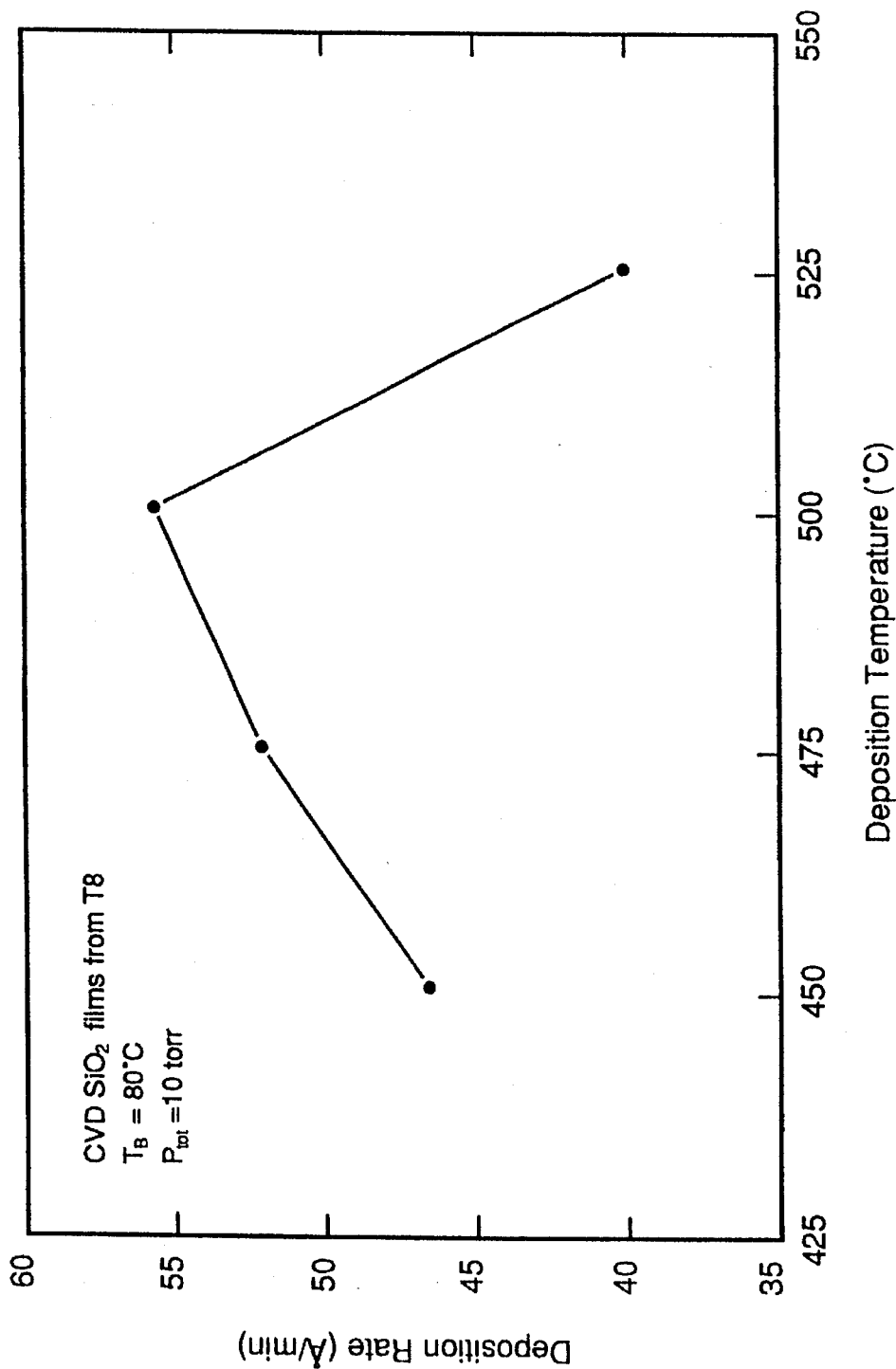
FIG. 4 is a graph of the refractive index as a function of the annealing temperatures of CVD $SiO_2$ films.

The deposition rate is varied by controlling the $O_2$ flow rate, the precursor temperature, the deposition temperature and the total substrate chamber 124 pressure. The deposition rate can vary from about 5.0 nm/min to about 15.0 nm/min. FIG. 4 shows the deposition rate as a function of substrate temperature, or deposition temperature. The precursor temperature, $O_2$ flow rate, and total substrate chamber 124 pressure used are 80° C., 10 sccm, and 10 torr, respectively.

Figure 3:
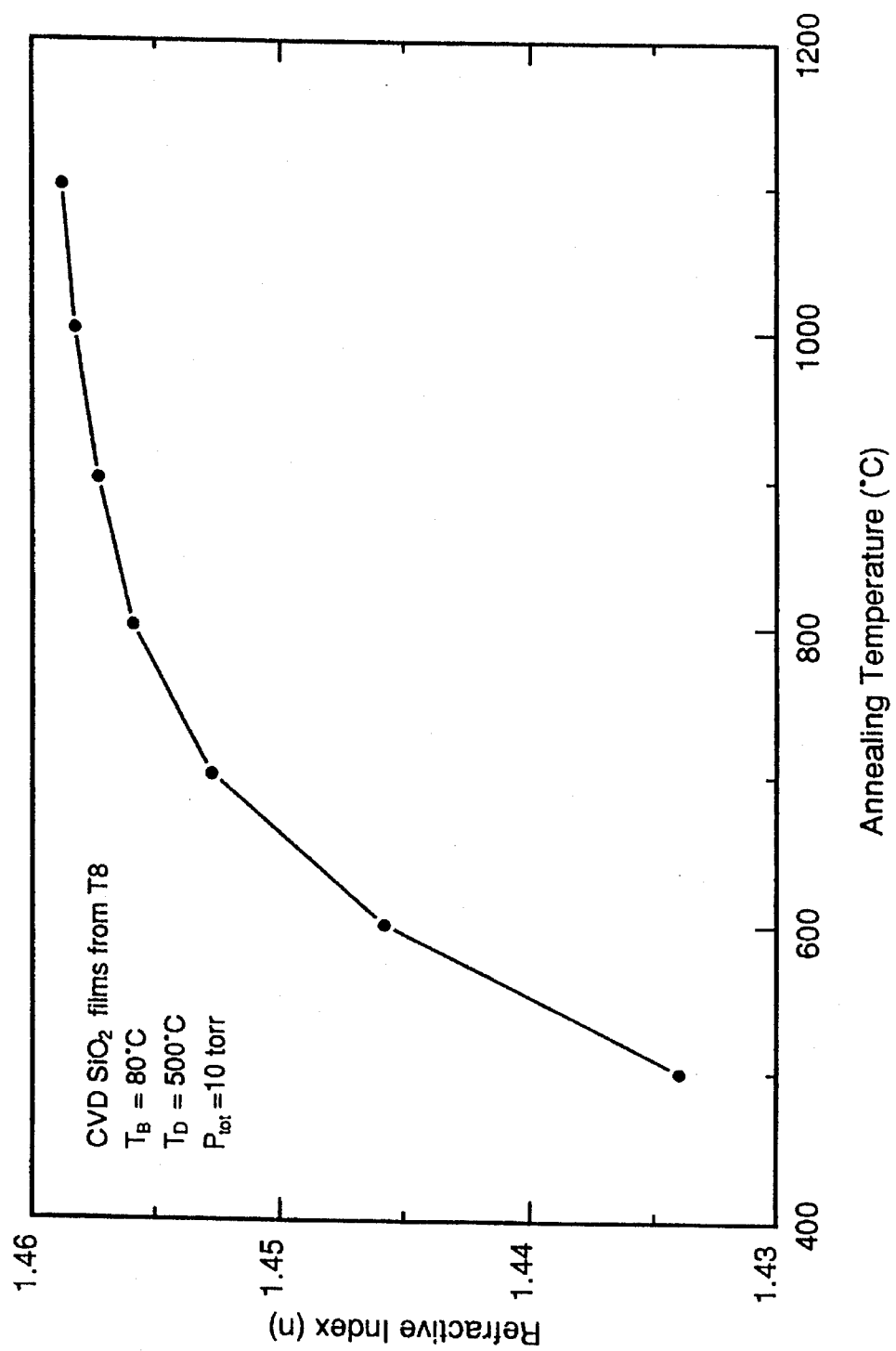
FIG. 3 is a graph of the deposition rate as a function of the substrate temperature.

The as-deposited $SiO_2$ film is specular, uniform, crack-free, and well adhered on the substrates 126. The as-deposited $SiO_2$ film has a refractive index of 1.434, at a wavelength of 632.8 nm, which corresponds to a packing density of 0.95. After high temperature annealing in argon, the refractive index of the film reaches a value of 1.459 which corresponds to a packing density of 0.998. The refractive index of $SiO_2$ films as a function of annealing temperature is illustrated in FIG. 3.

EXAMPLE 9

The reactor 150, as described in Example 8, is used with the same experimental set up. The precursor used is HT8 and is heated and maintained at 140° C. The precursor is transported by means of a carrier gas $O_2$, from an evaporation zone to the reaction chamber 110. The flow rate of the carrier gas is controlled by the mass flow controller 138 and is set to be 1000 sccm. In addition to the carrier gas $O_2$, nitrogen is fed to the deposition chamber 124 through conduit 136 as a dilute gas. The flow rate of $N_2$ is controlled by the mass flow controller 138 and is kept at 280 sccm. The vacuum pump 134 is not used in this example. The total chamber pressure is one atmosphere (760 torr) and the substrate temperature is kept at 500° C. The deposition rate varies from 7.0 nm/min to 14.0 nm/min.

EXAMPLE 10

The experimental set up is the same as in Example 8. A mixture of HT8 and HT10 (3.5:1) is used as precursors. The precursor is heated and maintained at 100° C. The precursor mixture of HT8 and HT10 is transported by means of a carrier gas $O_2$ from an evaporation zone to the reaction chamber 110. The flow rate of the carrier gas controlled by the mass flow controller 138 is set to be 1000 sccm. In addition to the carrier gas $O_2$, 250 sccm of moist $N_2$ (saturated with water vapor at 27° C.) is used as a dilute gas. The substrate temperature is kept at 500⁺C. The vacuum pump 134 is not in use in this example. The total deposition chamber 124 pressure is one atmosphere (760 torr). The deposition rate varies from 6.5 to 7.0 nm/min under this deposition condition.

APCVD, utilizing the mixture of HT8 and HT10 as a precursor, yields deposition transparent, uniform and well adhering films. The X-ray diffraction pattern of the films shows that the films are amorphous. These films show very good specular reflection, and have smooth surfaces, as viewed by means of both optical microscopy and scanning electron microscopy. The refractive index of the as-deposited film at a wavelength of 638.2 nm is 1.453, whereas a value of 1.458 is obtained for a film annealed at 1000° C. in argon. A refractive index value 1.453 corresponds to a packing density of 0.985, whereas a value of 1.458 corresponds to a packing density of 0.996.

EXAMPLE 11

The low pressure chemical vapor deposition experimental set up is the same as in Example 8. A mixture of HT8 and HT10 (about 3.5:1) is used as precursors. The precursor is heated and maintained at 100° C. The substrate 126 temperature is kept at 500° C. Oxygen is used as a carrier gas with a flow rate of 10 sccm. The total chamber pressure used is 10 torr.

EXAMPLE 12

$SiO_2$ films can also be deposited by photo-assisted chemical vapor deposition technique (PACVD). The precursor (HT8) is heated and maintained at 104° C. Oxygen gas is used as a carrier gas to deliver the precursor vapors into the reaction chamber 24. The flow rate of the carrier gas is 1000 sccm. The substrates 26 are maintained at 50°–200° C. A UV lamp, such as Hg-Xe arc lamp, $D_2$ lamp, and low-pressure $H_g$ lamp, is used to provide the necessary ultraviolet (UV) radiation for photodissociating the precursor vapors, HT8. The pressure in the reaction chamber is one atmosphere.

EXAMPLE 13

The Vacuum PACVD experiment is the same as in Example 12, however, the flow rate of the carrier gas is reduced 10 sccm. A vacuum pump is used to help deliver the precursor vapors into the reaction chamber 110. The total pressure in the reaction chamber is 1–5 torr. The precursor (HT8) is heated and maintained at 80°–100° C. The substrate temperature and UV source are same as those in Example 12.

EXAMPLE 14

The Laser-induced CVD experiment is the same as in Example 12 with the optical source used to photo dissociate the precursor vapors being a laser, such as ArF laser and KrF laser. The precursor temperature, carrier gas, flow rate of carrier gas, substrate temperature and the total pressure are the same as in Example 12.

EXAMPLE 15

The process of decomposing precursor vapors in the reaction chamber can be performed by generating the plasma, commonly known as plasma-enhanced chemical vapor deposition (PECVD). The generation of the precursor vapors (HT8) is accomplished by heating the precursor at 80°–100° C. The total pressure in the reaction chamber 24 is maintained in the range of 0.1 to 1.0 torr. The specimens are placed vertically in the reaction chamber 110 with every specimen connected to the same rf power terminal so that the surface of the specimens act as one electrode. The flow discharge is generated capacitatively between adjacent parallel-plate electrodes. The substrate temperature is maintained t 200°–300° C.

EXAMPLE 16

$SiO_2$ thin films are generated by remote plasma-enhanced chemical vapor deposition (RPECVD) process using HT8 as precursor. The RPECVD apparatus consists of two spatially separated regions; a plasma generation region and a thin film deposition region. Oxygen and helium gases are sent into a fused silica tube in which they are plasma excited by either rf or microwave sources. The precursor vapors and N₂ are introduced into the deposition region through an injection nozzle. The precursor vapors are generated by the same manner described in Example 8. Both plasma and precursor vapors are pulled into the deposition chamber 10 through an injection nozzle. The precursor vapors are generated in the same manner as described in Example 8. The substrates are placed in the deposition chamber and heated at 100°–400° C. The total pressure in the deposition chamber is in the range of 0.05–0.5 torr.

The examples given above are considered to be illustrative of the invention and are not to be construed as unduly limiting the invention which is properly set forth in the claims listed below.

What is claimed is:

1. The low temperature generation of films of $SiO_2$, on substrates that cannot withstand temperatures greater than about 500° C., comprising the step of chemical vapor deposition of hydridospherosiloxane, wherein said hydridospherosiloxane is produced by the steps of:
   a. preparing a biphasic reaction medium having a first solvent phase and a second solvent phase, said second solvent phase comprising a concentrated solution of a metal salt in a polar organic solvent and water;
   b. adding to the biphasic reaction medium of step a), a silicon compound represented by the formula:

$HSiX_3$, where X is a group which is hydrolyzable in the solvent of said first solvent phase;
   c. separating said first solvent phase from said second solvent phase;
   d. treating said separated first solvent phase with a metal salt containing carbonate ions, for a time period which is just sufficient to remove by-products;
   e. isolating a mixture of crystals of $(HSiO_{3/2})_8$, and $(HSiO_{3/2})_{10}$ by evaporation of said first solvent phase solvent; and
   f. washing said mixture of step e) with a hydrocarbon solvent and isolating crystals of $(HSiO_{3/2})_8$.

2. The low temperature $SiO_2$ film generation method of claim 1, wherein said first solvent phase contains a hydrocarbon solvent.

3. The low temperature $SiO_2$ film generation method of claim 1, wherein the solvent of said first solvent phase is an aliphatic or aromatic hydrocarbon.

4. The low temperature $SiO_2$ film generation method of claim 1, wherein the solvent of said second solvent phase is methanol or ethanol.

5. The low temperature $SiO_2$ film generation method of claim 1, wherein said metal salt is a salt of Fe(III).

6. The low temperature $SiO_2$ film generation method of claim 5, wherein the molar ratio of water to Fe(III), in step a) is less than 6.

7. The low temperature $SiO_2$ film generation method of claim 1, wherein X is Cl or $OCH_3$.

8. The low temperature $SiO_2$ film generation method of claim 7, wherein X is Cl.

9. The low temperature $SiO_2$ film generation method of claim 1, wherein said metal salt is sodium or potassium carbonate.

10. The low temperature $SiO_2$ film generation method of claim 2, further comprising repeating the sequence of steps a) through e), in step e) recovering solvent, and wherein said hydrocarbon solvent of each successive step a) is said recovered solvent of the prior step e).

11. The low temperature $SiO_2$ film generation method of claim 8, wherein hydrochloric acid is generated in step b), said hydrochloric acid is reacted with the residual metal carbonate of step d) to form a metal chloride salt.

12. The low temperature $SiO_2$ film generation method of claim 11, wherein the metal salt of step d) is sodium and the metal chloride is NaCl.

13. The low temperature $SiO_2$ film generation method of claim 1, wherein condensed, soluble hydrogensilsesquioxane resin, having the formula $(HSiO_{3/2})_n$, where n is an even integer greater than 8, is produced.

14. The low temperature $SiO_2$ film generation method of claim 1, wherein said method for producing hydridospherosiloxane is carried out as a continuous process.

15. The low temperatures generation of films of $SiO_2$, on substrates that cannot withstand temperatures greater than 500° C., comprising the step of chemical vapor deposition of hydridospherosiloxane, wherein said hydridospherosiloxane is produced in a continuous process by the steps of:
   a. preparing a biphasic reaction medium having a first solvent phase and a second solvent phase, said second solvent phase comprising a concentrated solution of a metal salt in a polar organic solvent and water;
   b. adding to the biphasic reaction medium of step a), a silicon compound represented by the formula:

$HSiX_3$, where X is is group which is hydrolyzable in the solvent of solvent of said first solvent phase;
   c. separating said first solvent phase from said second solvent phase;
   d. treating said separated first solvent phase with a metal salt containing carbonate ions, for a time period which is just sufficient to remove by-products;
   e. isolating a mixture of crystals of $(HSiO_{3/2})_8$, and $(HSiO_{3/2})_{10}$ by evaporation of said first solvent phase solvent; and
   f. washing said mixture of step e) with a hydrocarbon solvent and isolating crystals of $(HSiO_{3/2})_8$.

16. The low temperature generation of films of $SiO_2$, on substrates that cannot withstand temperatures greater than about 500° C., comprising the step of chemical vapor deposition of hydridospherosiloxane, said hydridospherosiloxane being represented by the formula $(HSiO_{3/2})_n$, n being 8 or 10,
   producing said hydridospherosiloxane in a continuous process by the steps of:
   a. preparing a biphasic reaction medium having a first solvent phase and a second solvent phase, said second solvent phase comprising a concentrated solution of a metal salt in a polar organic solvent and water;
   b. adding to the biphasic reaction medium of step a), a silicon compound represented by the formula:

$HSiX_3$, where X is is group which is hydrolyzable in the solvent of solvent of said first solvent phase;
   c. separating said first solvent phase from said second solvent phase;

d. treating said separated first solvent phase with a metal salt containing carbonate ions, for a time period which is just sufficient to remove by-products;
e. isolating a mixture of crystals of $(HSiO_{3/2})_8$, and $(HSiO_{3/2})_{10}$ by evaporation of said first solvent phase solvent; and
f. washing said mixture of step e) with a hydrocarbon solvent and isolating crystals of $(HSiO_{3/2})_8$, depositing said hydridospherosiloxanes on a substrate comprising the steps of:

heating said hydridospherosiloxane in a chamber, maintaining said substrate at less than 500° C., feeding oxygen to said chamber, generating a vapor, transporting said vapor to a deposition chamber, cooling said vapor in a cold trap to condense unreacted particles, and depositing said vapor on said substrate within said deposition chamber.

\* \* \* \* \*